Nov. 24, 1964     L. B. HOLMAN     3,158,568
GYRATORY SCREEN TENSIONING MEANS
Filed Aug. 21, 1961     2 Sheets-Sheet 1
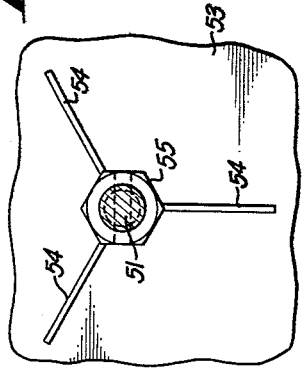
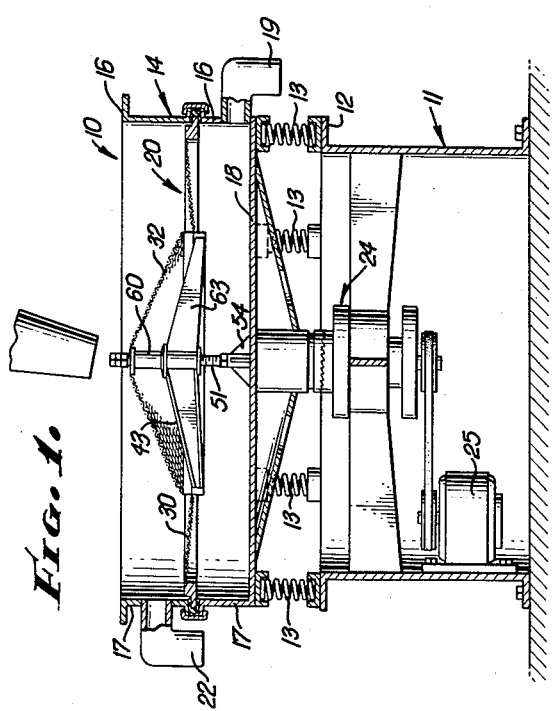
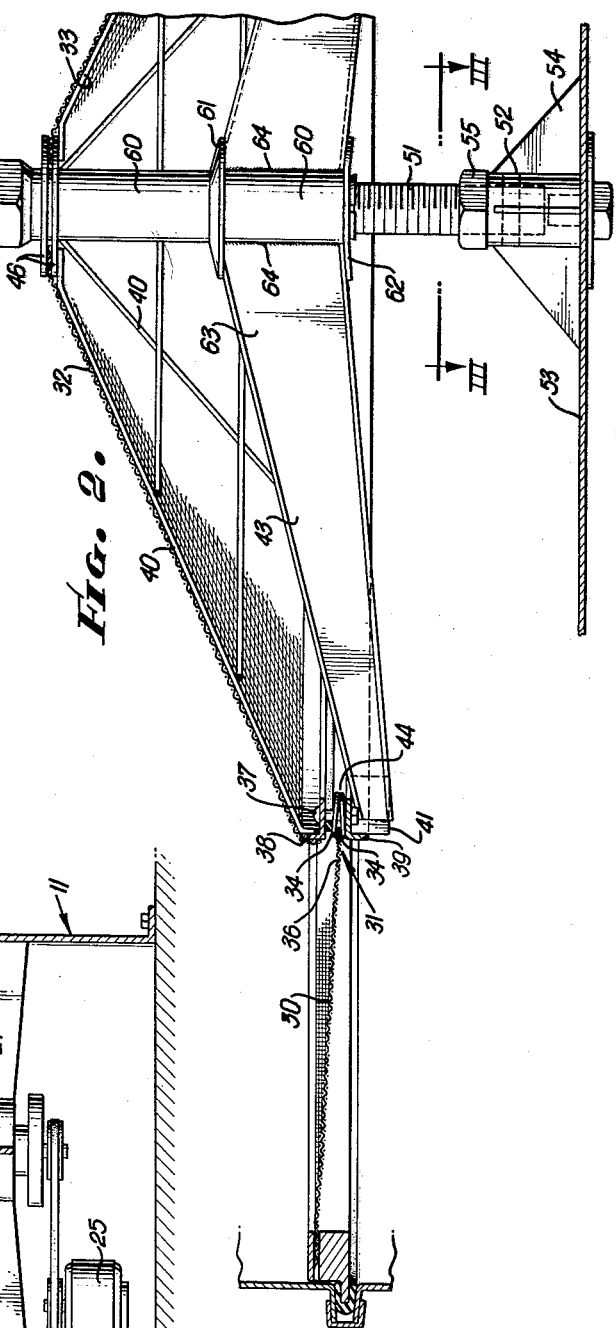
INVENTOR.
LEE B. HOLMAN
BY
*Miketta and Glenny*
ATTORNEYS.

Nov. 24, 1964 L. B. HOLMAN 3,158,568
GYRATORY SCREEN TENSIONING MEANS
Filed Aug. 21, 1961 2 Sheets-Sheet 2
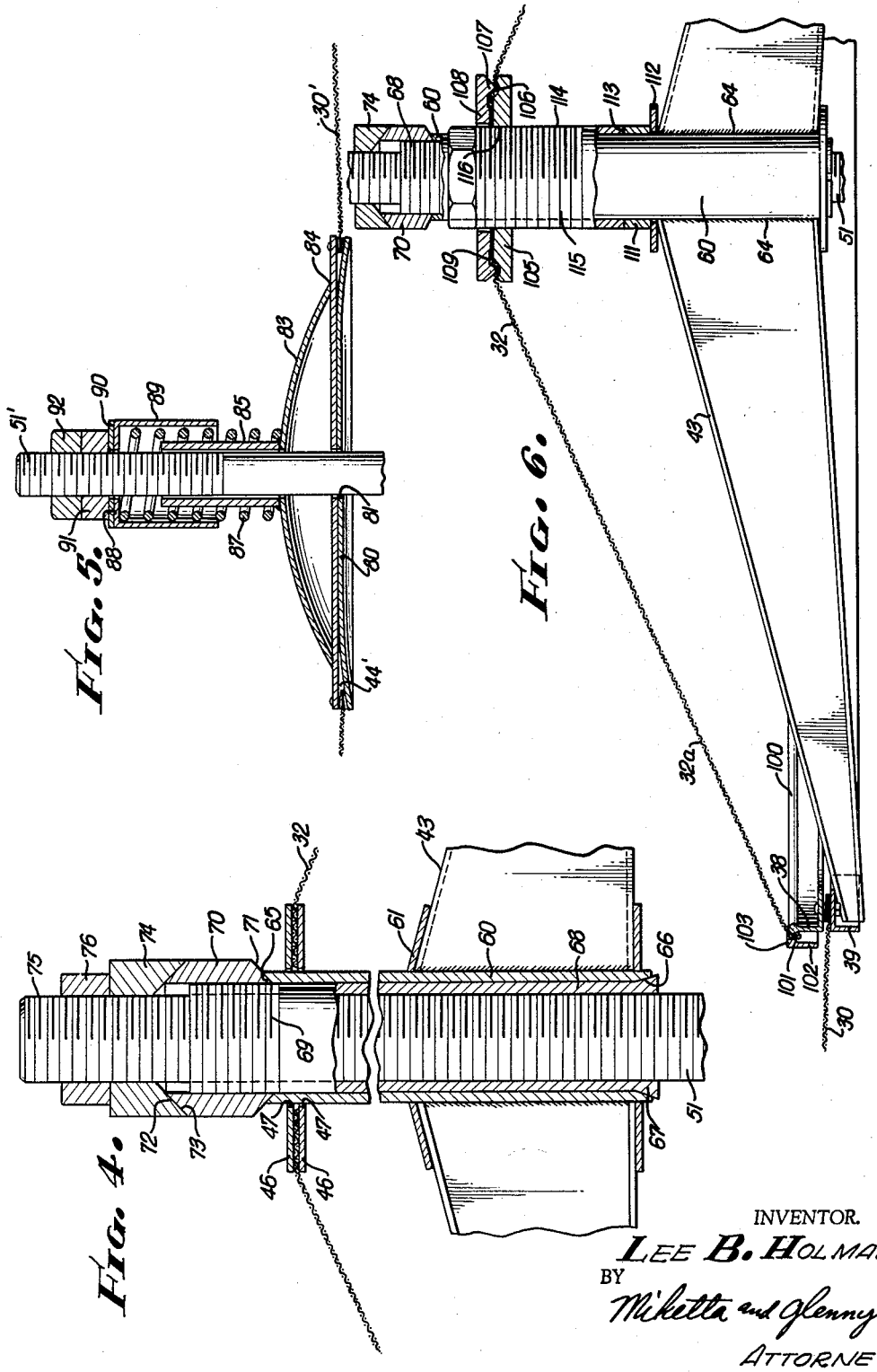
INVENTOR.
LEE B. HOLMAN
BY
Miketta and Glenny
ATTORNEYS.

United States Patent Office 3,158,568
Patented Nov. 24, 1964

3,158,568
GYRATORY SCREEN TENSIONING MEANS
Lee Butler Holman, Whittier, Calif., assignor to State Steel Products, Inc., City of Industry, Calif., a corporation of California
Filed Aug. 21, 1961, Ser. No. 132,974
12 Claims. (Cl. 209—274)

This invention relates generally to gyratory separator apparatus in which horizontal, vertical and gyratory motion components are imparted to loose flowable particulate material being separated by the apparatus. More particularly, the invention relates to a screen means having an upwardly inclined center portion for such a gyratory separator apparatus wherein the screen fabric is tensioned by novel means.

The present invention is particularly adapted for use with a cone-shaped gyratory screen means as shown in my co-pending application Serial No. 719,470, filed March 4, 1958, now Patent No. 3,011,639. The present application is a continuation-in-part thereof. Under certain conditions of loading and operation, a circular screen may be subjected to undesirable and undue whipping of portions of the screen if the screen fabric is not held under proper preselected tension. In the composite cone-shaped screen means of said application, an outer generally planar annular portion is secured at its outer periphery to a circular screen frame and the inner periphery of the annular screen portion is connected to the base of the center cone-shaped screen portion. The center cone-shaped screen portion is carried by suitable frame, may be pre-tensioned, and is connected by rigid annular means to the inner periphery of the annular portion.

The present invention particularly contemplates a screen tensioning means for such a composite screen means whereby a predetermined or preselected tension condition is imparted to the composite screen means and maintained under loading conditions, and wherein such tensioning means provides an arrangement whereby whipping of the composite screen means is reduced to a minimum.

The primary object of this invention therefore is to disclose and provide a novel screen tensioning means for a screen means for a gyratory separator apparatus.

An object of the invention is to disclose and provide a screen tensioning means adapted to substantially maintain a predetermined screen tension during operation.

Another object of the invention is to disclose and provide a screen tensioning means for a composite screen means wherein whipping of the screen means is reduced to a minimum and virtually eliminated.

A still further object of the invention is to disclose and provide a screen tensioning means for a composite screen means wherein the central portion of the screen means includes an upwardly inclined screen section and the tensioning means is particularly adapted to impart selected tension to an annular portion of said screen means.

A further object of the invention is to provide a screen tensioning arrangement for a gyratory screen means of circular form and having an uprising center screen portion; and wherein the center screen portion may be tensioned independently of radially outwardly disposed annular screen portions.

A further object of the invention is to disclose and provide a screen tensioning means for a composite gyratory screen means embodying several modifications including a cone-shaped central portion and also a plain screen means which may or may not include a relatively uprising central screen portion.

Generally speaking, the invention contemplates a means for tensioning a screen fabric adapted for use with a gyratory separator wherein a tension bolt is supported in axial fixed relation to the screen fabric means and the screen fabric means includes a central opening through which the bolt extends. Means are provided for connecting the bolt with the screen fabric and such connecting means may include an elongated sleeve member having a close fit with the bolt. The sleeve may also be connected with the screen fabric means and with the bolt in a particular manner whereby selected tension can be imparted to the screen fabric means.

Various other objects and advantages of this invention will be readily apparent from the following description of the drawings in which exemplary embodiments of the present invention are shown.

In the drawings:

FIG. 1 is a vertical sectional view of a gyratory separator embodying this invention.

FIG. 2 is an enlarged fragmentary sectional view showing an exemplary connection between the two screen portions of the composite screen means and the screen frame.

FIG. 3 is a fragmentary view taken in the horizontal plane indicated by line III—III of FIG. 2.

FIG. 4 is an enlarged elevational view of the tensioning means shown in FIG. 2.

FIG. 5 is an enlarged sectional view of a modification of the tensioning means as applied to a plain screen.

FIG. 6 is a fragmentary sectional view of a different modification of the tensioning means for independently tensioning a cone shaped screen portion of a composite screen means.

Generally speaking, a gyratory separator generally indicated at 10 (FIG. 1) may comprise a base means 11 provided with a top annular flange 12 upon which may be seated a plurality of circumaxially spaced coil springs 13 which support a screen box or shaking assembly 14. The screen assembly 14 may comprise two or more screen box sections or frames 16 each having a circular outwardly flanged wall 17. The bottom box section 16 includes an imperforate bottom wall 18 serving to distribute material passing through the screen to a discharge duct 19. Between the box sections 16 is secured in suitable manner a composite screen means 20 and the wall 17 of the upper box section may be provided with a discharge duct 22 for material not passing through the screen means.

Motion may be imparted to the screen assembly 14 by a gyratory motion imparting means generally indicated at 24 which is disposed along the axis of the screen assembly and base frame 11 and may be driven by motor means 25. The gyratory motion imparting means may include the structure described in my U.S. Patent 2,950,819 and in my co-pending application Serial No. 38,825. It will be understood that the gyratory motion imparting means in cooperation with coil springs 13 will produce and impart composite vertical, horizontal and gyratory motion components in and to the shaking box assembly 14.

The composite screen means as shown in FIG. 1 generally embodies a screen means similar to that described in my co-pending application 719,470. Such composite screen means includes an outer annular screen fabric portion 30 having its outer peripheral edge secured between opposed flanges on the screen box frame sections 16. The inner periphery of the annular screen fabric portion 30 may be connected by means at 31 to a central upstanding cone-shaped screen fabric portion 32. The central screen portion 32 is carried by a screen wire net or framework 33, supported from means 31, and the fabrics of the screen portion 32 may be suitably pretensioned as described in my co-pending application.

In an example of the present invention the means for connecting the outer screen portion 30 to the central screen portion 32 may comprise a pair of relatively thin annular metal rings 34 in superimposed spaced relation and receiving therebetween inner peripheral edge 36 of the annular screen portion 30. The inner peripheral edge 16 may be secured to said rings by suitable means as welding, brazing or the like. The rings 34 may be provided with circumferentially spaced ports to receive securing bolt and nut assemblies 37 which extend through aligned ports in a top angle section ring 38 and a bottom angle section ring 39 of virtually the same diameter and between which the pair of rings 34 may be disposed. The upper angle section member 38 may be secured to radially extending wire members 40 of wire network 33 supporting the inner cone-shaped screen fabric 32. The lower angle section member 39 may be connected at spaced points about its circumference to radially outwardly extending brackets 41 carried by extremities of spider arms or beams 43 of which four may be provided in 90° spaced relation. Suitable seal means may be provided between the angle section members 38 and 39 and the rings 34. It will thus be apparent that the outer annular screen portion 30 is now rigidly connected at its outer periphery to the screen box sections and at its inner periphery to spider arms 43 and also to the outer periphery of the cone-shaped central screen fabric 32. The rings 34 define a central opening 44 in the screen fabric portion 30.

At the vertex of the cone-shaped screen portion 32 may be provided a pair of metal washers 46 which receive therebetween the upper end portions of the screen fabric 32 and which are provided with a central opening 47. The bottom metal washer 46 may be secured to upper ends of radial wire members 40 by suitable means as welding and the like.

Means for tensioning the composite screen means for preventing whipping thereof may comprise a rigid center upstanding member or bolt 51 having a bottom threaded end in threaded engagement with an upstanding socket connector 52 secured to a bottom member or bottom wall 53 of the bottom box frame section 17. The socket 52 may be reinforced and supported by a plurality of gusset plates 54. A jam nut 55 may be provided on bolt 51 to positively locate and hold said bolt against movement. To further secure the bolt 51, a transverse bore may be drilled through socket 52 and the end of bolt 51 after it is positioned and a locking pin inserted therein.

The spider arms 43 may be connected together adjacent the axis of the screen means by an elongated upstanding outer tubular member 60 secured as by welding to inner ends of arms 43 through top annular plate 61 and a bottom plate 62. Each arm 43 may be of relatively shallow channel section, longitudinally tapered, and web 63 of each arm 43 may be welded as at 64 to the outer surface of tubular member 60. Tubular member 60 extends above the apex of the cone-shaped screen portion 32 and may terminate in a top edge face 65 provided with an inwardly and downwardly directed taper. The bottom end of tubular member 60 may include an internal end flared face 66 which may cooperate with outwardly flared end faces 67 of an inner locking sleeve 68 received within tubular member 60 and projecting upwardly beyond the top end of member 60. The upper end of locking sleeve 68 may be externally threaded at 69 for threaded engagement with a tapered nut 70, said nut 70 having a bottom tapered end face 71 adapted to engage the tapered face 65 on the tubular member 60 and an upper tapered end face 72 adapted to engage a corresponding end tapered face 73 provided on a tension nut 74. The tension nut 74 is provided threaded engagement with external threads 75 provided on the top end of the tension bolt 51. Above tension nut 74 may be provided a jam nut 76.

To tension the screen means the locking sleeve 68 is assembled with bolt 51 prior to assembly of bolt 51 with the screen means and at that time is received within the tubular member 60. The tapered nut 70 may then be threaded on threads 69 of the locking sleeve until it is in finger-tight engagement with tapered surface 65 on tubular member 60. Tensioning nut 74 may then be threaded on the upper end of bolt 51 and while holding tapered nut 70 tight, the nut 74 may be turned so as to tension the screen means. It will be apparent that turning of nut 74 in a selected direction will urge nut 70, locking sleeve 68, tubular member 60 and spider arms 43 downwardly relative to the tension bolt so as to displace downwardly the inner periphery of the outer screen portion 30 and thus tension the outer screen portion 30. When desired tension is achieved, the tensioning nut 74 may be held while the tapered nut 70 is drawn tight in order to force the collet end of the locking sleeve 68 into tight locking relationship with respect to outer tubular member 60 and to thus cause a frictional grasping and binding between outer tubular member 60, locking sleeve 58 and tension bolt 51. After tapered nut 70 has been tightened, the tensioning nut 74 is then drawn as tight as possible against the tapered nut 70 and the jam nut 76 may be set against the tension nut 74.

It will be readily apparent that because of the close sliding friction fit between the center spider means and tensioning bolt 51 and the relatively rigid connection at the inner periphery of the annular screen portion 30, that any play between the screen means and the box frame section is substantially eliminated while yet providing for selected tensioning of the annular outer screen portion.

It is important to note that the screen-tensioning means described above may also be readily applied to a screen means having the annular portion extended into relatively close spaced relation to the axis of the screen means as shown in FIG. 5. It will be understood that the screen box frame and the outer periphery of screen fabric 30' may be operably connected as in the prior embodiment. The inner periphery of the screen fabric 30' provides a coaxial opening 44' and may be connected and secured to a center disc 80 ported at 81 to permit passage therethrough of the upstanding tensioning bolt 51'. If desired, the center disc 80 may be made of two plies or layers which may be slightly separated at their periphery to provide space for grasping the inner peripheral edge of the fabric portion 30'.

Means for tensioning the screen fabric portion 30' may include a convexly curved or part-spherical screen tension member 83 having a diameter less than the diameter of disc 80 and having its peripheral edge seated on the top surface of disc 80 as at 84. The member 83 is ported for passage of bolt 51' and may have secured thereto an upstanding sleeve member 85 secured as by welding to member 83 adjacent its port. The sleeve 85 is provided a relatively close sliding fit with the bolt 51'. Sleeved over the sleeve 85 may be a suitable coil spring 87 seated at one end on curved member 83 and having its top end seated on an end wall 88 of a spring cap 89 having a cylindrical wall partially enclosing the spring 87 and the upper portion of the sleeve 85. Wall 88 of cap 89 is ported for bolt 51' and seated on wall 88 may be a washer 90, a bottom tension nut 91 and a top lock nut 92.

In a tensioning operation, the bottom nut 91 is tightened, the spring cap 89 is urged downwardly relative to the bolt 51', the spring 87 is compressed and the curved member 83 transmits such downward biased force to the outer peripheral margins of the disc 80 and in spaced relation to the axis of the screen assembly. Resilient characteristics of coil spring 87 will be different than such characteristics of the part-spherical, curved member 83. While screen fabric 30' may be readily directly tensioned by such screen tensioning means, during operation, the different spring characteristics of curved member 83 will tend to dampen any resonant vibrations from the coil spring 87 and whipping of the center portion of the spring will be virtually eliminated because of the close sliding fit of the spring guide sleeve 85 with bolt 51', and the coaction of spring 87 and curved member 83.

It will thus be readily understood that in both above described embodiments of this invention means are provided for connecting an upstanding bolt with the screen fabric means in such a manner that an elongated sleeve member is provided with a relatively close fit with the bolt and that means are provided for connecting the sleeve member with the screen fabric means and also for operably connecting the sleeve member with the upstanding bolt.

In FIG. 6 is shown another modification of this invention wherein cone-shaped screen 32 may be mounted in somewhat different manner and may be tensioned independently of the annular screen 30 after installation on a gyratory separator of the type described.

The screen tensioning means of this embodiment includes center spider arms 43 having a central outer sleeve 64 through which may extend a tension bolt 51 as in the embodiment shown in FIG. 1. The outer ends of spider arms 43 may be provided with annular members 38 and 39 providing a connection as before to annular screen portion 30. In this instance, upper angle section annular member 38 may be provided with a bead 100 on its top edge over which screen fabric 32a of the cone-shaped screen 32 may pass in a smooth, snug fashion. The lower edge of screen fabric 32a may be provided with a bead 101 which is disposed below flange bead 100 and which may be secured by an annular hold-down strip 102 provided with inwardly extending spaced projections 103 for firmly grasping the edge of the screen and pressing the same against bead 101. The strip 102 may be secured to the flange member 38 as by a plurality of spaced nut and bolt assemblies or as by welding.

The top vertex of the screen 32 may be provided with an opening to receive therethrough an axial screen tensioning assembly and may be secured by a bottom disc 105 provided with an annular channel 106 for receiving an annular downwardly directed bead 107 provided on a top disc 108 so that the inner peripheral margins 109 of screen fabric 32a may be tightly and firmly pressed and frictionally held between and in annular groove 106 and mating bead 107. The top and bottom discs 108, 105 may be secured together in any convenient manner as by spot welding or by spaced nut and bolt assemblies.

The tensioning means for the cone-shaped screen also includes a bottom bearing and guide sleeve 111 seated on a washer 112 provided at the upper edge of the arms 43 and outer sleeve 60. Bearing sleeve 111 provides an annular top edge bearing face 113 adapted to slidably and rotatably seat the bottom end of a tensioning sleeve 114. Tensioning sleeve 114 is slidable over the outer sleeve 60 and is provided with external threads 115 for threaded engagement with internal threads 116 on the bottom disc 105. The top end of tensioning sleeve 114 may be suitably polygonally configured (such as hexagonal) to facilitate grasping with a wrench. It will be thus apparent that upon rotation of tensioning sleeve 114 the internally threaded bottom disc 105 is moved longitudinally along the sleeve 60 and thereby provides adjustment of tension in the screen means 32 by displacement of disc 105 axially of the sleeve 64. Suitable means (not shown) may be employed to lock the tensioning sleeve against rotation during operation of the separator.

It will thus be apparent that when the cone screen tensioning means of FIG. 6 is employed in association with the tensioning means shown in FIG. 1, that the annular screen portion may be tensioned independently of the cone screen portion while the screen is in assembly with the gyratory separator. It will thus be readily apparent also that the included angle between the cone screen 32 and the annular screen portion 30 may be varied by such independently operable tensioning means. The capability of the composite screen means to handle and effectively operate material of different characteristics is thus enhanced by such independent tensioning means and variation in such included angle.

It is important to note that in each instance the screen-tensioning means includes a sleeve member which is relatively closely fitted on a bolt and is connected to the screen fabric in such a manner that whipping of the screen fabric during operation is substantially eliminated or reduced to a negligible minimum.

It will be understood that various changes and modifications may be made in the above embodiments of this invention which come within the spirit thereof and all such changes and modifications coming within the scope of appended claims are embraced thereby.

I claim:

1. A screen construction for a gyratory separator for controlling whipping of a screen during operation comprising: a generally circular screen frame means including opposed peripheral flanges and having a bottom member extending thereacross; an upstanding screen tensioning bolt fixed to said bottom member at the center of said frame means; a screen fabric means including an annular screen portion secured at its outer periphery to the flanges of said frame means and provided with a central opening defining an inner periphery; said screen fabric means including a center cone screen portion connected at its outer cone periphery to said inner fabric periphery and provided with a port at its cone top; a rigid center member connected with said inner fabric periphery and provided with an axially extending outer sleeve slidably receiving therethrough said bolt; and means for tensioning said annular screen fabric means including an inner locking sleeve ensleeved over said bolt between said bolt and outer sleeve, a locking nut in threaded engagement with said inner sleeve for drawing said inner sleeve into tight locking relation with said outer sleeve, and a tension nut in threaded engagement with said bolt and having bearing contact with said locking nut on said inner sleeve.

2. In combination with a gyratory separator having a generally circular screen fabric means connected with a peripheral frame member of a resiliently supported screen frame, said screen frame having a bottom member extending thereacross in fixed relation to the peripheral frame member, said circular screen fabric means having a central opening therein, the provision of a screen tension bolt fixed to said bottom member, extending axially of said frame, and through said central opening; means operably connecting said bolt with said screen fabric means at said opening including a virtually rigid means transversely extending across said opening and connected to said screen fabric means; elongated sleeve means receiving said bolt therethrough and supported by said rigid means, said elongated sleeve means including an outer sleeve member connected with said transverse rigid means, said elongated sleeve means having a close fit with said bolt to limit lateral play of the sleeve means with respect to the bolt; and means carried by the bolt for moving the elongated sleeve means and said transverse rigid means relative to the bolt for tensioning the screen fabric means.

3. A combination as stated in claim 2 wherein said elongated sleeve means has an external threaded portion, and a nut in engagement with said threaded portion and having pressure engagement with said outer sleeve member.

4. In a combination as stated in claim 3 including a nut having threaded engagement with said bolt above said sleeve means and having pressure engagement with said nut threaded on said elongated sleeve means.

5. In a combination as stated in claim 4 wherein the pressure engagement of said nuts and said one nut with said elongated sleeve means is along inclined surfaces.

6. In a combination as stated in claim 2 the provision of a coil spring ensleeved over said elongated sleeve means, and a disc type spring element between said coil spring and said transverse means.

7. In a combination as stated in claim 2 including a composite spring means for tensioning said screen fabric means, said composite spring means including a coil spring ensleeved over said elongated sleeve means and a disc-type metal spring having its peripheral edge in pressure contact with said transverse means and having a central ported portion secured to said elongated sleeve means.

8. In a screen construction for a gyratory separator having a central inclined screen portion and a bolt extending through said central screen portion and having an axial extension projecting beyond said screen portion, the provision of: an internally threaded disk member connected to the center of said inclined screen portion; and means supported from said bolt for adjustably displacing said internally threaded member relative to the axial extension of said bolt, said means comprising an externally threaded sleeve rotatably mounted over said bolt and held against longitudinal displacement in one direction relative to said axial extension of the bolt.

9. In a screen construction as stated in claim 8 including: an annular screen portion disposed at an angle to said central inclined screen portion; and means associated with said bolt for tensioning said annular screen portion independently of said central inclined screen portion.

10. Means for tensioning a screen fabric means adapted for use with a gyratory separator comprising: a tension bolt supported in axial fixed relation; a screen fabric means having a central opening through which said bolt extends; means at said opening connecting said bolt with said screen fabric means comprising an elongated sleeve means having a close fit with said bolt; means for operably connecting said elongated sleeve means with said screen fabric means including a central disk fixed to said screen fabric means, a convex spring disk bearing upon said central disk and connected with said elongated sleeve means, and coiled spring means ensleeved over said elongated sleeve means and bearing on said spring disk; and means for operably connecting said elongated sleeve means with said bolt including a nut carried on said bolt and engageable with said sleeve means for tensioning the screen fabric means.

11. Means for tensioning a screen fabric means adapted for use with a gyratory separator, comprising: a tension bolt supported in axial fixed relation; a screen fabric means having a central opening through which said bolt extends; means at said opening connecting said bolt with said screen fabric means comprising an elongated sleeve means having a close fit with said bolt; means for operably connecting said elongated sleeve means with said screen fabric means; and means for operably connecting said elongated sleeve means with said bolt; said screen fabric means including a central inclined screen portion; and means for tensioning said central screen portion including an outer externally threaded tensioning sleeve rotatable with respect to said elongated sleeve means, a disk member connected with the central portion of said inclined screen portion and provided with internal threads in engagement with said outer externally threaded tensioning sleeve.

12. A means as stated in claim 11 wherein said means for operably connecting said elongated sleeve means with said screen fabric means includes a bearing surface for supporting said tensioning sleeve.

References Cited in the file of this patent

UNITED STATES PATENTS

| 456,584 | Morse | July 28, 1891 |
| 777,702 | Traylor | Dec. 20, 1904 |
| 1,438,489 | Hawley | Dec. 12, 1922 |
| 1,685,942 | Deister | Oct. 2, 1928 |
| 1,722,792 | Gruender | July 30, 1929 |
| 1,919,485 | Soldan | July 25, 1933 |
| 2,194,721 | Piper | Mar. 26, 1940 |
| 2,714,961 | Miller | Aug. 9, 1955 |
| 2,950,819 | Holman | Aug. 30, 1960 |

FOREIGN PATENTS

| 6,581 | France (Addition) | Jan. 7, 1907 |
| 368,026 | Great Britain | Mar. 3, 1932 |
| 1,026,147 | France | Apr. 23, 1953 |